`US010108715B2`

United States Patent
Desineni et al.

(10) Patent No.: US 10,108,715 B2
(45) Date of Patent: Oct. 23, 2018

(54) TRANSFORMATION AND PRESENTATION OF ON-DEMAND NATIVE APPLICATION CRAWLING RESULTS

(71) Applicant: Samsung Electronics Co., Ltd., Suwon-si, Gyeonggi-do (KR)

(72) Inventors: Kalyan Desineni, Mountain View, CA (US); Sudhir Mohan, Saratoga, CA (US); Leigh L. Klotz, Jr., Palo Alto, CA (US); Manikandan Sankaranarasimhan, Hayward, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/245,440

(22) Filed: Aug. 24, 2016

(65) Prior Publication Data

US 2017/0193112 A1 Jul. 6, 2017

Related U.S. Application Data

(63) Continuation of application No. 14/986,569, filed on Dec. 31, 2015.

(51) Int. Cl.
*G06F 17/30* (2006.01)
(52) U.S. Cl.
CPC .... *G06F 17/30864* (2013.01); *G06F 17/3092* (2013.01); *G06F 17/30719* (2013.01)
(58) Field of Classification Search
None
See application file for complete search history.

(56) References Cited

U.S. PATENT DOCUMENTS

| | | | |
|---|---|---|---|
| 6,260,043 B1 | 7/2001 | Puri et al. | |
| 7,269,543 B2 | 9/2007 | Salmonsen et al. | |
| 8,868,537 B1 * | 10/2014 | Colgrove | G06F 17/30424 235/375 |
| 9,002,821 B2 | 4/2015 | Chang et al. | |
| 9,135,346 B2 | 9/2015 | Chang | |
| 9,311,168 B1 | 4/2016 | Lewis et al. | |
| 9,448,776 B1 * | 9/2016 | Sankaran | G06F 8/76 |
| 9,495,444 B2 | 11/2016 | Shapira et al. | |
| 9,953,084 B2 * | 4/2018 | Futty | G06F 17/30864 |
| 99,990,428 * | 6/2018 | Anand | G06F 17/30864 |

(Continued)

OTHER PUBLICATIONS

PCT International Search Report and Written Opinion for PCT Application No. PCT/IB2016/054875 dated Nov. 30, 2016, 14 pages.

*Primary Examiner* — Richard Bowen
(74) *Attorney, Agent, or Firm* — Jefferson IP Law, LLP

(57) ABSTRACT

A system includes a search engine configured to search mobile applications based on a query received from a mobile device and to output search results in a first format. A first processor is configured to process the search results and to generate processed search results in the first format for rendering on the mobile device. A first converter is configured to convert the processed search results into a second format. A second processor is configured to process the processed search results in the second format and to generate a presentation of the processed search results in the second format. A second converter is configured to convert the presentation into the first format or a third format for rendering on the mobile device.

20 Claims, 7 Drawing Sheets

(56) References Cited

U.S. PATENT DOCUMENTS

| | | |
|---|---|---|
| 2007/0208713 A1 | 9/2007 | Krishnaprasad et al. |
| 2008/0091448 A1* | 4/2008 | Niheu ................... G06Q 10/06 705/301 |
| 2008/0144130 A1 | 6/2008 | Kerigan et al. |
| 2009/0112808 A1 | 4/2009 | Howcroft et al. |
| 2011/0073177 A1 | 3/2011 | Osawa et al. |
| 2011/0083167 A1 | 4/2011 | Carpenter et al. |
| 2011/0093515 A1 | 4/2011 | Albanese |
| 2011/0314004 A1* | 12/2011 | Mehta ................ G06F 17/30017 707/723 |
| 2012/0124061 A1 | 5/2012 | Macbeth et al. |
| 2012/0184255 A1* | 7/2012 | Macaluso ................ G06F 8/63 455/414.3 |
| 2012/0284247 A1 | 11/2012 | Jiang et al. |
| 2012/0290941 A1 | 11/2012 | Tallapaneni et al. |
| 2012/0303601 A1* | 11/2012 | Peng ................... G06F 17/3087 707/706 |
| 2012/0317187 A1 | 12/2012 | Fredricksen et al. |
| 2013/0073993 A1 | 3/2013 | Schimpf et al. |
| 2013/0166525 A1* | 6/2013 | Naranjo ............ G06F 17/30864 707/706 |
| 2013/0290322 A1 | 10/2013 | Prosnitz et al. |
| 2013/0290344 A1 | 10/2013 | Glover et al. |
| 2013/0325833 A1* | 12/2013 | Guan ................... G09B 19/06 707/706 |
| 2013/0332442 A1 | 12/2013 | Liu et al. |
| 2014/0035887 A1 | 2/2014 | Kim |
| 2014/0040231 A1 | 2/2014 | Lin |
| 2014/0229462 A1* | 8/2014 | Lo ................... G06F 17/30528 707/707 |
| 2014/0250106 A1* | 9/2014 | Shapira ............ G06F 17/30864 707/722 |
| 2014/0279997 A1* | 9/2014 | Chiussi ............ G06F 17/30864 707/706 |
| 2014/0365462 A1 | 12/2014 | Chang |
| 2015/0066886 A1* | 3/2015 | Wu .................... G06F 17/30864 707/706 |
| 2015/0154644 A1* | 6/2015 | Saxena ............. G06Q 30/0269 705/14.66 |
| 2015/0156061 A1* | 6/2015 | Saxena ............... G06F 9/44505 715/733 |
| 2015/0220601 A1* | 8/2015 | Leyba ............... G06F 17/30498 707/706 |
| 2015/0278245 A1* | 10/2015 | Sagar ................ G06F 17/30174 707/610 |
| 2015/0317365 A1* | 11/2015 | Andress .............. G06F 17/2247 707/722 |
| 2015/0356471 A1* | 12/2015 | Shaw ................... G06Q 10/025 705/6 |
| 2015/0363368 A1* | 12/2015 | Zhang ............. G06F 17/30893 715/222 |
| 2015/0370810 A1 | 12/2015 | Chen et al. |
| 2015/0370812 A1 | 12/2015 | Lee et al. |
| 2016/0124914 A1* | 5/2016 | Deng .................... G06F 17/212 715/204 |
| 2016/0142859 A1 | 5/2016 | Molinet et al. |
| 2016/0188720 A1 | 6/2016 | Schlesinger et al. |
| 2016/0203002 A1 | 7/2016 | Kannan et al. |
| 2016/0234330 A1 | 8/2016 | Popowitz et al. |
| 2016/0321052 A1 | 11/2016 | Sharifi et al. |
| 2017/0017672 A1* | 1/2017 | Fan ................... G06F 17/30902 |
| 2017/0046432 A1 | 2/2017 | Desineni et al. |
| 2017/0046437 A1 | 2/2017 | Desineni et al. |
| 2017/0046438 A1 | 2/2017 | Desineni et al. |
| 2017/0124101 A1 | 5/2017 | Nigam |
| 2017/0192987 A1 | 7/2017 | Desineni et al. |

\* cited by examiner

TRANSFORMATION AND PRESENTATION OF ON-DEMAND NATIVE APPLICATION CRAWLING RESULTS

CROSS-REFERENCE TO RELATED APPLICATIONS

The present application is a continuation of U.S. patent application Ser. No. 14/986,569 filed on Dec. 31, 2015. The entire disclosure of the application referenced above is incorporated by reference.

FIELD

The present disclosure relates to crawling applications for content, and more particularly to transformation and presentation of crawling results.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Search engines are an integral part of today's world. A key component of a search engine is the collection of search indices that power the search. In the context of a search engine, a search index can be an inverted index that associates keywords or combinations of keywords to documents (e.g., web pages) that contain the keyword or combination of keywords. In order to generate and maintain these search indexes, most search engines use crawlers to identify documents and information within the documents. A traditional crawler requests a document from a content provider and the content provider provides the requested document to the crawler. The crawler then identifies and indexes the keywords and combinations of keywords in the document.

As the world transitions to a mobile-based architecture, the way content providers provide access to their content is changing. User devices can access content using a variety of different mechanisms. For example, user devices can obtain content from a content provider using a native application dedicated to accessing a software application of the content provider or a web browser that accesses the software application using a web browser. Furthermore, content providers may allow access to different content depending on the geographic region of a user device, the type of user device, the time of day, and/or the operating system of the user device. For these and other reasons, crawling has become an increasingly difficult task.

Further, presentation of search results on the user device, which are obtained based on a query received from the user device, may be performed in many ways. The latency and quality of rendering the search results on the user device may differ depending on the manner of presenting the search results and can impact user experience.

SUMMARY

A system includes a search engine configured to search mobile applications based on a query received from a mobile device and to output search results in a first format. A first processor is configured to process the search results and to generate processed search results in the first format for rendering on the mobile device. A first converter is configured to convert the processed search results into a second format. A second processor is configured to process the processed search results in the second format and to generate a presentation of the processed search results in the second format. A second converter is configured to convert the presentation into the first format or a third format for rendering on the mobile device.

In other features, the first format is a native format of the mobile device, the second format is a platform-neutral format, and the third format is hypertext markup language format. In other features, the presentation includes a summary of the processed search results. In other features, the second processor is further configured to add information to the presentation based on content of the presentation for rendering on the mobile device. In other features, the second processor is configured to generate the presentation by extracting data from the processed search results and by transforming the extracted data into the second format.

In other features, the second processor is configured to extract data from the processed search results, transform the extracted data into a fourth format that includes semantic tagging, and output the extracted data into the fourth format. In other features, the fourth format is JavaScript Object Notation format. In other features, the second converter is configured to convert the extracted data into the third format. In other features, the system includes a third processor configured to process the processed search results in the second format and to generate multiple presentations of the processed search results for rendering on multiple mobile devices having different rendering capabilities. In other features, the second converter is configured to convert the multiple presentations into the third format for rendering on the mobile devices.

A method includes generating search results in a first format by searching mobile applications based on a query received from a mobile device. The method includes processing the search results to generate processed search results in the first format for rendering on the mobile device. The method includes converting the processed search results into a second format. The method includes processing the processed search results in the second format to generate a presentation of the processed search results in the second format. The method includes converting the presentation into the first format or a third format for rendering on the mobile device.

In other features, the first format is a native format of the mobile device. The second format is a platform-neutral format. The third format is hypertext markup language format. In other features, the presentation includes a summary of the processed search results. In other features, the method includes adding information to the presentation based on content of the presentation for rendering on the mobile device. In other features, the method includes generating the presentation by extracting data from the processed search results and by transforming the extracted data into the second format.

In other features, the method includes extracting data from the processed search results. The method includes transforming the extracted data into a fourth format that includes semantic tagging. The method includes outputting the extracted data into the fourth format. In other features, the fourth format is JavaScript Object Notation format. In other features, the method includes converting the extracted data into the third format. In other features, the method includes processing the processed search results in the second format to generate multiple presentations of the processed search results for rendering on multiple mobile devices having different rendering capabilities. In other features, the method includes converting the presentations into the third format for rendering on the mobile devices.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
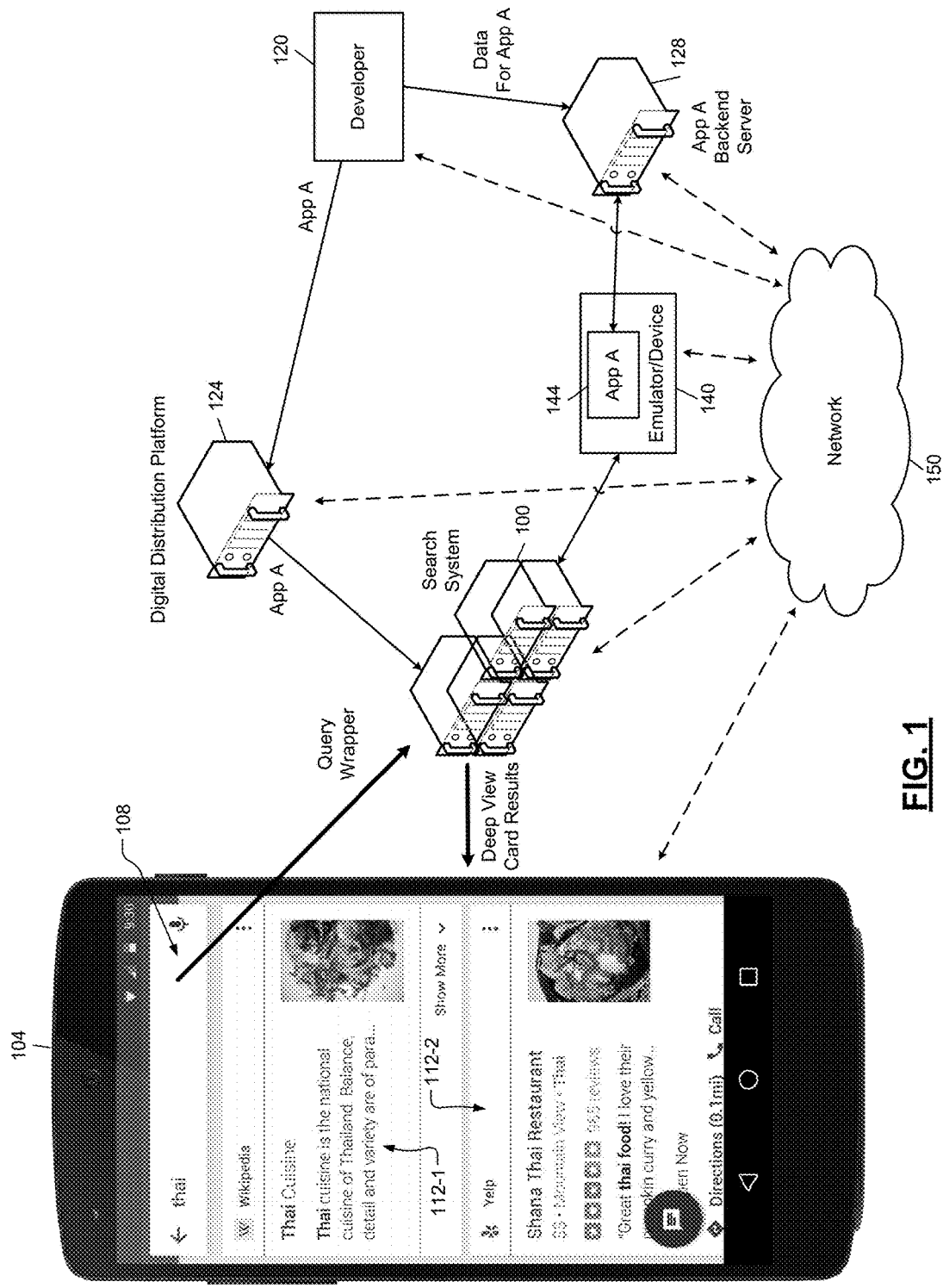
FIG. 1 is an example of a graphical user interface and high-level functional block diagram according to the principles of the present disclosure.

In order to present content from mobile applications (referred to interchangeably as "apps"), a search system generally crawls and scrapes the mobile apps to extract the content and index the content. This requires significant resources, both at the time of incorporating a new app into the search system as well as when updating the search system to acquire additional or changed content from the app. The expense may be in terms of human operator time, processing time, and storage space.

Some apps may present application programming interfaces (APIs), which can be queried by the search system to retrieve results in real time. By obtaining results in real time, upfront processing and storage costs can be reduced. However, many apps do not present APIs accessible to a third party. As a result, these apps are currently crawled, scraped, stored, and indexed. Further, some apps have no static content to be scraped. Search results related to these apps may therefore lack rich content.

This approach may also reduce latency. For example, content crawled and stored in advance of use may be stale or inaccurate by the time it is used. A just-in-time fetching mechanism returns fresh content and a cache reduces processing time for results that are deemed fresh enough. Thus, freshness of content may be improved by obtaining the content from the app nearer the time of use.

Presenting results as described below may increase fidelity to developer logic and presentation. App developers often have "secret sauce" logic or presentation choices that are not easily reproduced simply by operating on their static content. For example, app content may vary by context, with local business listings varying depending on the requester location in a complex fashion. Performing a search over crawled content requires the search system to emulate the logic of the app, including its dependence on user context and presentation choices, possibly producing inferior results, and nearly always requiring greater per-app effort. The present disclosure uses the developer's own logic to provide the developer's best search results directly to users in an automated fashion, with greatly reduced per-app human effort.

Further, the search results can be presented or rendered on a user device in many ways. For example, the search results may be rendered on the user device in hypertext markup language (HTML) and/or a native format of the user device. For operating systems such as the Android operating system or the iOS operating system, the native format may be user interface extensible markup language (UIXML) format or JavaScript object notation (JSON) format.

The search results may be rendered exactly as obtained from the applications without any processing or after slight modification. Alternatively, the search results may be reformatted and presented to the user device in a summary form. Moreover, in some instances, it may be desirable to scrape and transform the search results data for presenting to a third party (e.g., a business entity) that may be interested in semantically-tagged data, but may not be interested in the app developer's formatting.

The search results are obtained from an app using a just-in-time (or, on-demand) system that performs a query on a native copy of the app or on a web edition of the app. As described below, this on-demand system is referred to as a dynamic acquisition system and may include a web scrape system for accessing data from a web edition of an app, if available. The dynamic acquisition system includes a native scrape system that acquires data from a native edition of an app, which is running on a hardware device or an emulated device under the control of the native scrape system.

The native scrape system may have sub-systems devoted to popular operating systems, such as the Android operating system and the iOS operating system. The dynamic acquisition system also includes an application programming interface (API) passthrough system configured to transmit API calls to a backend server associated with an app to acquire content directly.

The search results may be generated by a native scrape system, and/or a web scrape system, as described below. Accordingly, the search results may be in different formats. For example, the search results generated by the App cloud may be in the native format (e.g., UIXML format), while those generated by the Web cloud may be in HTML format. Alternatively, there may be other types of systems providing search results in different formats. Processing the search results in these different formats, to achieve the above objectives (i.e., to generate the different types of presentations mentioned above), can be onerous.

Instead, according to the present disclosure, when further processing of the search results is desired, the search results may be first converted into a platform-neutral format, which can then be processed to achieve the above objectives. These and other aspects of the present disclosure are described below in detail with reference to FIGS. 7-9. For a detailed discussion of these and additional basic concepts that will aid in understanding the present disclosure, see commonly-assigned U.S. patent application Ser. No. 14/981,244, filed on Dec. 28, 2015, titled "Cloud-Enabled Architecture for On-Demand Native Application Crawling," with first-named inventor Kalyan Desineni, the entire disclosure of which is incorporated by reference.

Overview

FIG. 1 shows a search system 100 providing results to a user device 104. The user device 104 is depicted as a smart phone, but could be any other type of user device, such as a laptop, tablet, smartwatch, or desktop computer. Search functionality may be built into an operating system of the user device 104, into a launcher app installed on the user device 104, into a search-system-specific app, or, using a Software Development Kit (SDK), into any other app designed to offer search functionality.

In one example, a text box 108 allows a user to type, speak, or paste text. This text is sent in a query wrapper to the search system 100. The search system 100 responds to the user device 104 with results, which may be in the form of deep view cards (DVCs). A DVC for an app or a state of an app shows additional information, not just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment.

Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and it may even allow the user to directly perform an action without having to navigate to the app state. If the action the user wants to take is to obtain information, in some circumstances, the DVC itself may provide the necessary information to accomplish such action.

For example, a query for "Thai" may return a first DVC 112-1 for the WIKIPEDIA online encyclopedia app and a second DVC 112-2 for the YELP restaurant app. The first DVC 112-1 is related to information about Thai cuisine, while the second DVC 112-2 is directed to a specific restaurant having "Thai" in the name, the reviews, and in the designated cuisine of the restaurant.

An example app (App A) is developed by a developer 120 and provided to a digital distribution platform 124. The digital distribution platform 124 distributes apps to devices such to the user device 104. Popular digital distribution platforms include the GOOGLE PLAY digital distribution platform from Google Inc. and the APP STORE digital distribution platform from Apple Inc. If a result pertaining to App A is shown to a user of the user device 104, the user selects that result. However, if App A is not already present on the user device 104, App A may be downloaded to the user device 104 from the digital distribution platform 124.

The developer 120 stores any data on which App A needs to rely in a backend server 128. For example, if App A were the YELP restaurant review application, the YELP restaurant review application itself may not store all of the information about all of the restaurants within its database. Instead, this information would be stored in the backend server 128 and queried on demand.

As described in more detail below, when the search system 100 receives the query wrapper, the search system 100 may activate search functionality in one or more apps that the search system 100 believes may have search results relevant to the query wrapper.

This search functionality may be activated by running a copy of each app in an emulator or device. For example, as shown in FIG. 1, an emulator/device 140 is shown with a copy 144 of App A. As described in more detail below, the emulator/device 140 may include copies of other apps as well, and each one can be opened or brought to the foreground depending on the search functionality desired by the search system 100. The copy 144 of App A queries the backend server 128. The information provided in return is scraped by the emulator/device 140 and provided back to the search system 100. For example, the DVCs 112-1 and 112-2 may have been retrieved from respective copies of the WIKIPEDIA encyclopedia app and the YELP restaurant review app.

In other words, the emulator/device 140 can execute the WIKIPEDIA app, perform a search for "THAI," and provide DVC content obtained from the WIKIPEDIA app in real time. The term "real time" in this context generally requires that the delay between the user making a request and the results being returned is on the order of milliseconds or seconds, not tens of seconds, minutes, or hours. In other words, the user will not view the search app as unresponsive due to a long wait for results. Further, with the exception of caching, which may be available in some implementations, "real time" means that the results are procured directly in response to the request as quickly as possible and promptly displayed to the user.

In these respects, "real time" results differ from pre-scraped results that may be obtained ahead of time based on anticipated user queries. In other words, "real time" results are obtained from an app immediately following, and directly responsive to, a request from an active user who is expecting a prompt response to the query.

Other apps, such as the GASBUDDY gas station pricing app, do not have static states that can be scraped and do not offer a third party API. Therefore, in order to provide DVC content for the GasBuddy app, the present disclosure implements on-demand native app crawling. By executing the GasBuddy app within the emulator/device 140, the content displayed by the GasBuddy app can be scraped on-demand and provided as DVC content by the search system.

The emulator/device 140 may be configured to provide context based on, for example, a location of the user device 104. In other words, the GasBuddy app executing within the emulator/device 140 may be told (such as by forcing the GPS coordinates or other location service of the emulator/device 140) that the location is the same as the present location of the user device 104. In this way, the results generated by the GasBuddy app are relevant to the location of the user device 104.

While the data flow in FIG. 1 is shown with solid lines, the various devices and systems in FIG. 1 may actually communicate with each other via network 150. The network 150 may include wired and wireless local area networks, personal area networks, and wide area networks such as the Internet.

Showtimes App

Figure 2:
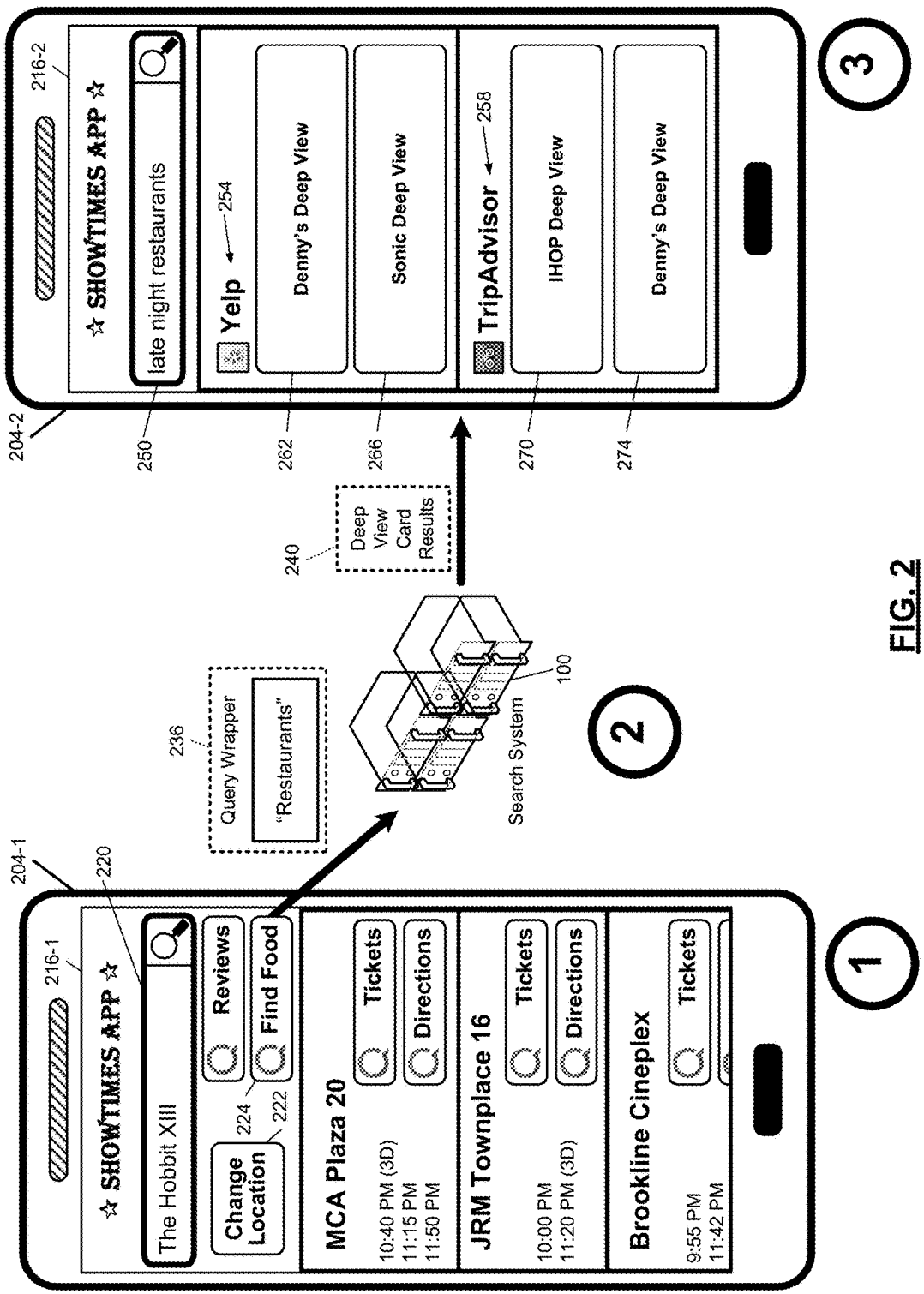
FIG. 2 is another example of a graphical user interface and high-level functional block diagram.

In FIG. 2, an unsophisticated showtimes app 216 is shown running on a device 204. A first state 216-1 of the showtimes app 216 is shown within a representation 204-1 of the device 204. A second state 216-2 of the showtimes app 216 is shown within a representation 204-2 of the device 204-2. In the simple interface of the first state 216-1, a search bar 220 identifies a movie for which theater showtimes are being displayed (a fictional "The Hobbit XIII").

The first state 216-1 displays theaters and showtimes for theaters located near the present location of the device 204 but may allow the user to change the desired location using a "change location" button 222. A variety of functional search buttons are provided, including a "find food" button 224. As an example only, a stylized "Q" may be displayed, which is associated with Quixey, Inc. of Mountain View, Calif.

When a user selects (such as by tapping their finger) the "find food" button 224, a query wrapper 236 is sent to the search system 100. The query wrapper 236 includes an indication that food results are desired, such as a text query of "restaurants." The search system 100 interprets the query, gathers results, and provides deep view card (DVC) results 240 to the second state 216-2 of the showtimes app 216.

The search system 100 may contextualize the query based on data known to the search system 100 or provided by the device 204. For example, the search system 100 may recognize that the present local time where the device 204 is located is late evening and therefore perform a search for "late night restaurants." In addition, the search system 100 may provide results based on a location of the device 204. The location of the device 204 may be provided within the query wrapper 236 or may be determined in another way, such as based on IP geolocation.

In the second state 216-2, a query box 250 may indicate a textual representation of a performed query. Although the text shown reads "late night restaurants," the initial text query of "restaurants" may instead be shown. In other implementations, no indication of the query is visible. In various implementations, the query box 250 may allow a user to modify the query and perform a new search.

The DVC results 240 from the search system 100 include a DVC 254 for the YELP app and a DVC 258 for the TRIPADVISOR travel review app. While not shown with actual rich data, placeholders for deep views (DVs) 262 and 266 are shown within the Yelp DVC 254. The DV 262 corresponds to a specific DENNY'S restaurant while the DV 266 corresponds to a specific SONIC drive-in restaurant. The TripAdvisor DVC 258 includes a DV 270 for an HOP restaurant and a DV 274 for a Denny's restaurant, again shown only as outlines without the rich content generally present in DVCs. In various implementations, if the DVs 262 and 274 are for the same Denny's restaurant, one of the DVs 262 and 274 may be omitted from the displayed results to make room for other results (in this case, likely other restaurants).

Note that each of the DVCs 254 and 258 includes multiple DVs. Depending on quantity of search results, scores associated with the search results, and screen space, some DVCs will have only a single DV while some DVCs may have more than two DVs. For example, if the Yelp DVC 254 was only provided with a single DV, there may be additional room to display a third DV for the TripAdvisor DVC 258.

The order of the DVs within a DVC may be set based on an order established by the corresponding app. For example, the order of the DVs 262 and 266 for the Yelp DVC 254 may be in the same order in which the Denny's and Sonic locations would be shown when the search was performed within the Yelp app itself. In addition, the DVs selected for presentation to the user of the showtimes app 216 may be the very first results within the Yelp app, indicating that the Yelp app considered those results to be most relevant.

In other words, the identity and order of the DVs within a DVC may be established by the app itself. Meanwhile, the ordering of the DVs within the presented search results may be based on a number of factors, including user engagement with an app (an app that receives more clicks when presented to the user may increase in the rankings) and reliability of the app (applications that historically return results less responsive to user queries may have decreased rankings).

Search System

Figure 3:
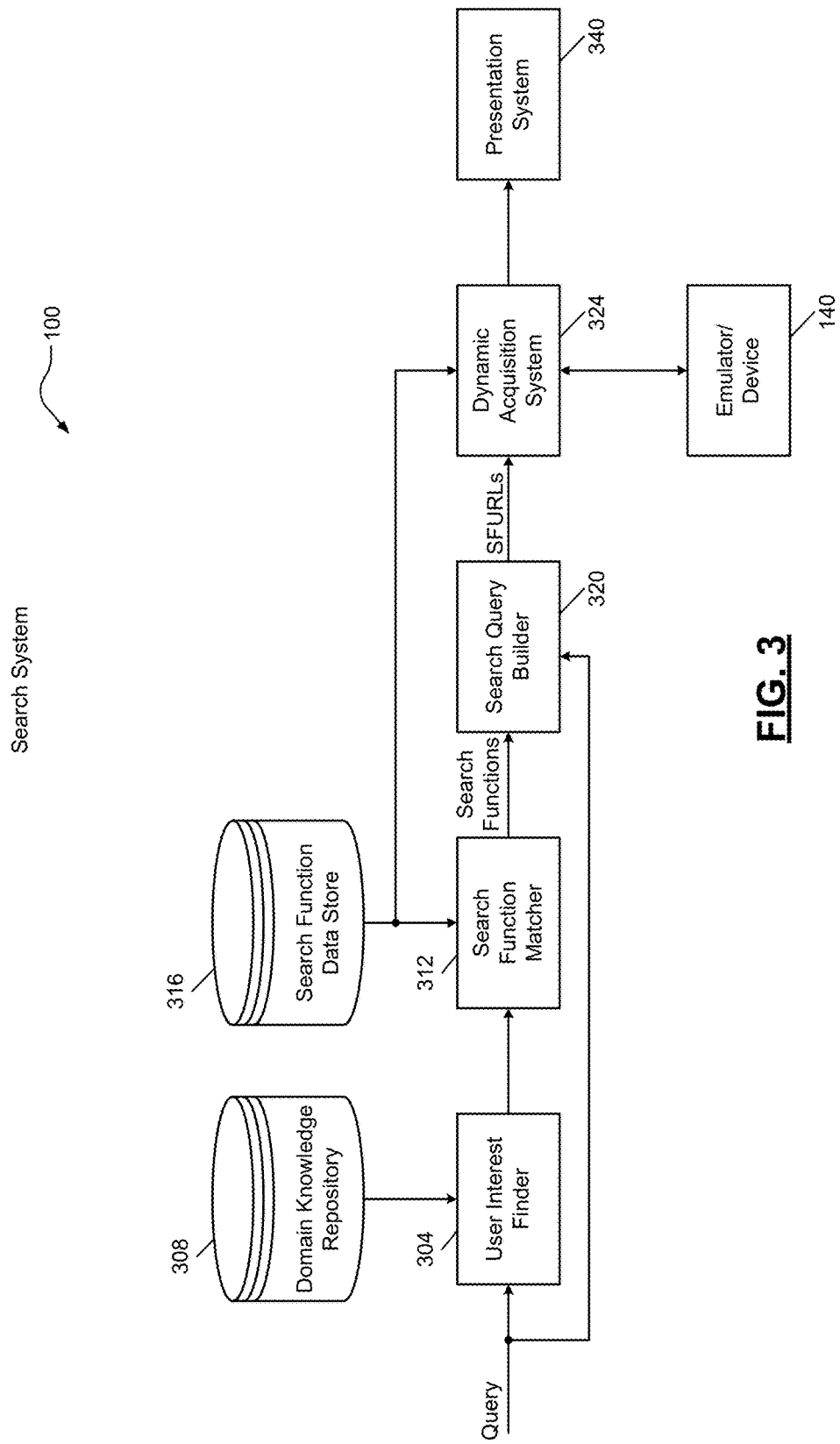
FIG. 3 is a functional block diagram of an example implementation of a search system.

In FIG. 3, a functional block diagram of an example implementation of the search system 100 includes a user interest finder 304 that attempts to determine what entity type is desired for deep view card results. The types of entities mentioned in a user query may be an indicator of what entity type the user desires, but that is not necessarily the case.

For example, if a query is "SFO JFK," the entity types are likely "airport codes" but the user interest is more likely to be "flights" than "airport codes." In particular, the user is likely interested in "flights" parameterized by a departure (with a value of SFO) and a destination (with a value of JFK).

This parameterization is matched in a search function matcher 312 to a set of search functions from a search function data store 316. Parameters for the search functions are provided from the query by a search query builder 320.

The entity type detection of the user interest finder 304 may be based on a domain knowledge repository 308. Multiple different interpretations of the query may be output by the user interest finder 304. For example only, a certain string may be a movie name as well as the name of a video game. The most likely interpretations are provided to a search function matcher 312.

As a simple example, the domain knowledge repository 308 may have text data about a variety of industry verticals. For example, the domain knowledge repository 308 may have lists of restaurant names, lists of movie names, lists of actor names, lists of video games, lists of states and provinces, etc. Strings can be matched against the lists in the domain knowledge repository 308 to infer what type of entity the string refers to. Entity type detection is described in more detail in commonly-assigned U.S. Prov. App. No. 62/220,737 filed Sep. 18, 2015, titled "Entity-Type Search System," with first-named inventor Sudhir Mohan, the entire disclosure of which is incorporated by reference.

The search function matcher 312 selects search functions from a search function data store 316 that have output entity types matching the desired entity type recognized by the user interest finder 304, and with query parameter entity types matching the function descriptions in the search function data store 316. The search function data store 316 is populated for each app using an onboarding process. During the onboarding process, configurators (which may include human operators and/or automated algorithms) identify what searches can be performed in an app and what types of entity data is specified in each search.

For each search function in the set of relevant search functions, the search query builder 320 combines the generic search function with specific values from the query. The resulting populated search functions may be referred to as Search Function Uniform Resource Locators (SFURLs). For illustration only, an example SFURL is presented here:
func://googleplay/android/com.ted.android/39/VXhV_hNM?p0=wearing%20nothing%20new As shown, a Search Function URL (SFURL) may encode a name ("googleplay") of the digital distribution platform from which the app was obtained, since different digital distribution platforms may have different versions of an app. The SFURL may also have an indicator ("googleplay") of the operating system for the app, a name ("com.ted.android") of the app, a version ("39") of the app, and an identifier ("VXhV_hNM") of the specific search function. The SFURL may also include a serialized sequence of parameters to provide to the search function. A first parameter may be named p0 and have a value of "wearing nothing new."

The search function data store 316 stores a guide for each SFURL indicating how to traverse the app from the home (or, default) state to the search input state where the search is performed. This guide may be a series of user interface (UI) interactions. The identifier in the SFURL may, in some implementations, be a hash of this guide.

The search function data store 316 may also store guide data for each input (also called a parameter) for the search. In other words, the guide dictates how a value can be supplied for a parameter within the search input state. For example, this may include an identification of a UI element corresponding to that parameter, and what UI action to perform in order to control that parameter.

Because apps cannot always be launched to a specific state simply with a URL or other URI (Uniform Resource Identifier), the search system of the present application may navigate to a desired state with a combination of intent calls and user interface (UI) injection. The term "intent" is generally associated with the ANDROID operating system, but is used in this disclosure simply to refer to a programmatic approach to reaching a specific state. Corresponding elements for the IOS operating system may be referred to as view controllers.

UI replay may be used to simulate a user tapping or making other gestures in an app as well as for supplying data, such as text normally entered by a user through a soft keyboard. In various implementations, UI replay may be accomplished using an accessibility framework provided by the operating system or by a search-enabled app. Some states may be reached by a combination of intent invocation and UI replay. For example, an intent may be invoked to arrive at a search state and then UI replay simulates a user typing text and clicking a search button.

A dynamic acquisition system 324 accesses data requested by the SFURLs. For example, the dynamic acquisition system 324 may access native apps running in emulators or devices, such as the emulator/device 140. The dynamic acquisition system 324 may also access web editions of an app using a live web scraping system. When using a native app, the dynamic acquisition system 324 may rely on search guides from the search function data store 316 to navigate to the appropriate state and supply the parameters to the app within the emulator/device 140.

As described in more detail below, a presentation system 340 may parse and format results obtained by the dynamic acquisition system 324. The presentation system 340 then provides results to the user device that transmitted the original query. For example, the presentation system 340 may format some results to fit a screen of the user device. For other results, such as from predetermined apps, the presentation system 340 may remove, transpose, or otherwise modify specific data from results.

Dynamic Acquisition System

Figure 4:
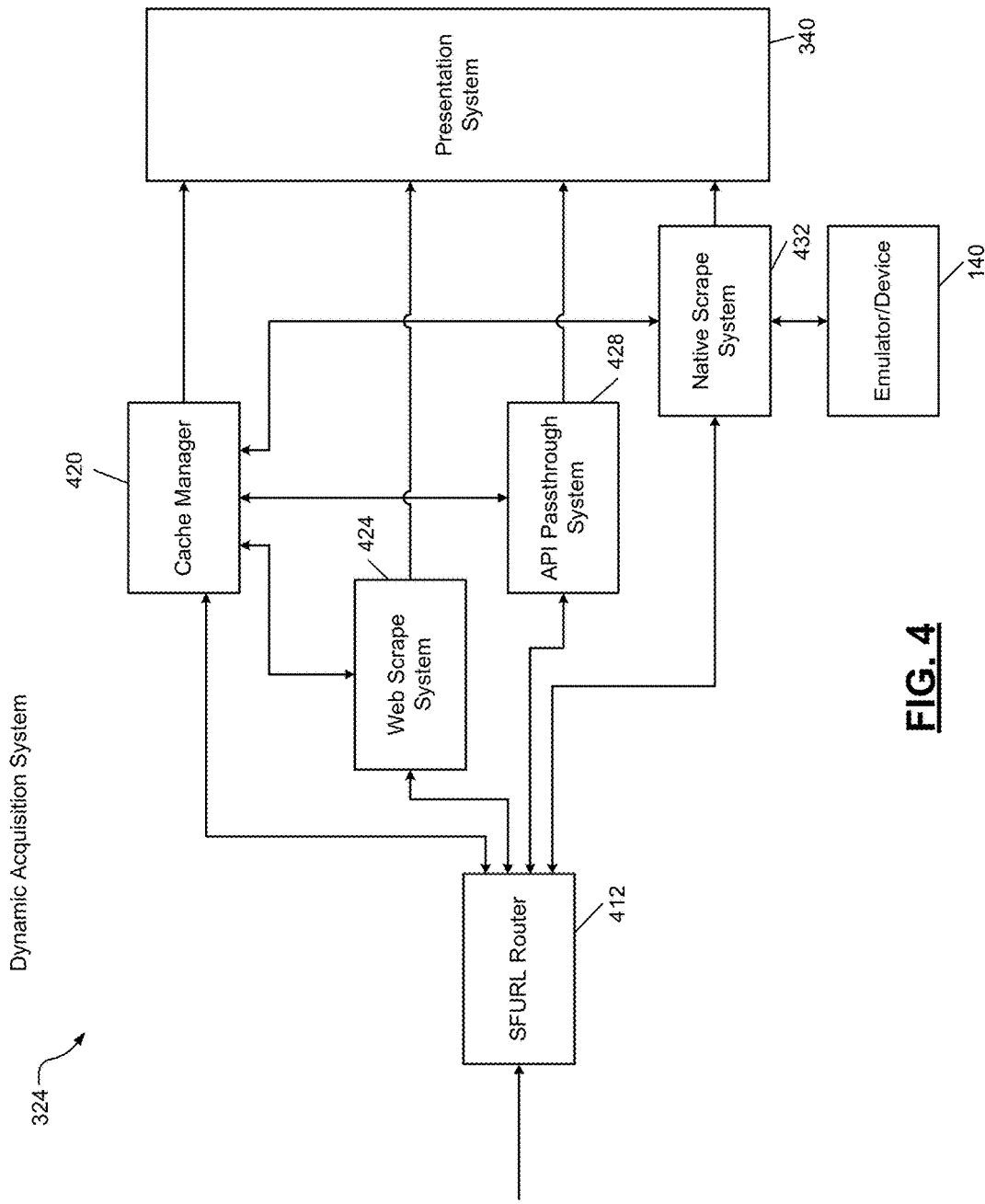
FIG. 4 is a functional block diagram of an example implementation of a dynamic acquisition system.

In FIG. 4, an example implementation of the dynamic acquisition system 324 is shown. An SFURL router 412 determines whether the query can be satisfied from cached results by consulting a cache manager 420. If the query cannot be satisfied by cached results, if caching is not enabled in the dynamic acquisition system 324, or if the cached results are out of date, the SFURL router 412 forwards the query to one or more of a web scrape system 424, an API passthrough 428, and a native scrape system 432.

Results that are substantially out of date may have already been deleted by the cache manager 420. Meanwhile, cache results that are only slightly out of date may be verified by passing the query to the web scrape system 424, the API passthrough 428, and/or the native scrape system 432. Results from one of these sources or from a combination of the sources are provided to the presentation system 340.

Results that are being verified may immediately be returned for presentation to a user. Results that have changed or been deleted can be updated in a further message to the user device. This increases responsiveness and may not even be discernible to a user of the user device. Results that are frequently found to have changed during verification indicate that the app updates more frequently than the cache is updated. The data should therefore be evicted from the cache or marked as stale more quickly.

Figure 5:
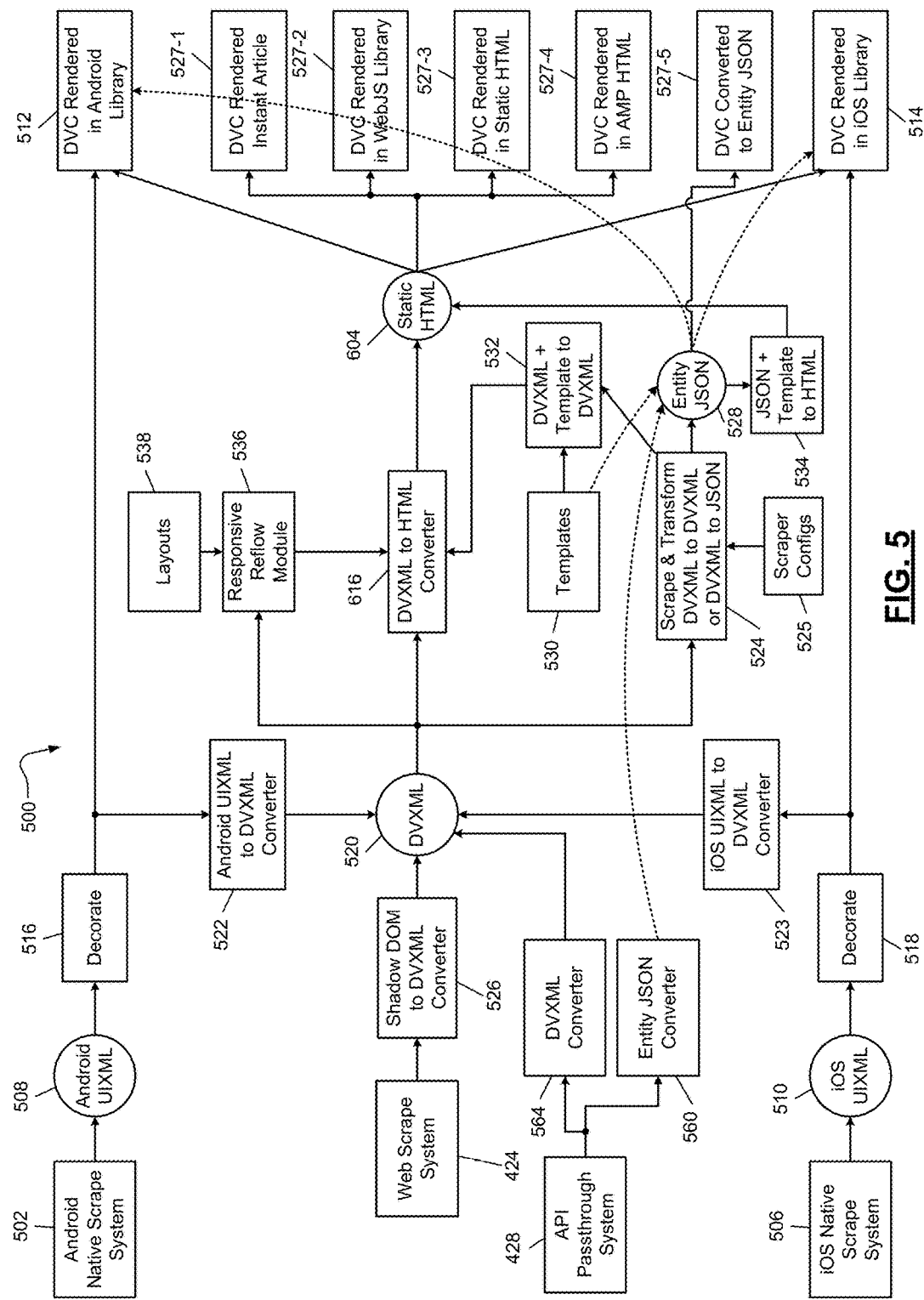
FIG. 5 is a block diagram of an example implementation of a results presentation system according to the principles of the present disclosure.

The results from the API passthrough 428 may be converted to JSON by entity JSON converter 560 as shown in FIG. 5 and sent directly as entity JSON 528. Additionally or alternatively, results from the API passthrough 428 may be converted to DVXML 520 by DVXML converter 564 and sent as DVXML 520.

The web scrape system 424 may implement a traditional web scraping algorithm or may be glue logic for interfacing with a traditional web scraper. In various implementations, a functional URL received from the query router may be transformed into a web URL, and the web scrape system 424 then accesses the web URL using HTTP (hypertext transfer protocol). Content, such as an HTML (hypertext markup language), is returned by the web server identified by the web URL and scraped.

The API passthrough 428 passes an API call through to a third-party app that publicly exposes an API. The API passthrough 428 may include or access a data store with records indicating how to transform a functional URL into an API call recognized by the third-party API. In various implementations, the third-party API may not be documented but is publicly accessible. If the undocumented third-party API ceases to work as expected or is blocked, the SFURL router 412 may direct requests for that API instead to the app itself in the native scrape system 432.

Presentation System

Figure 6:
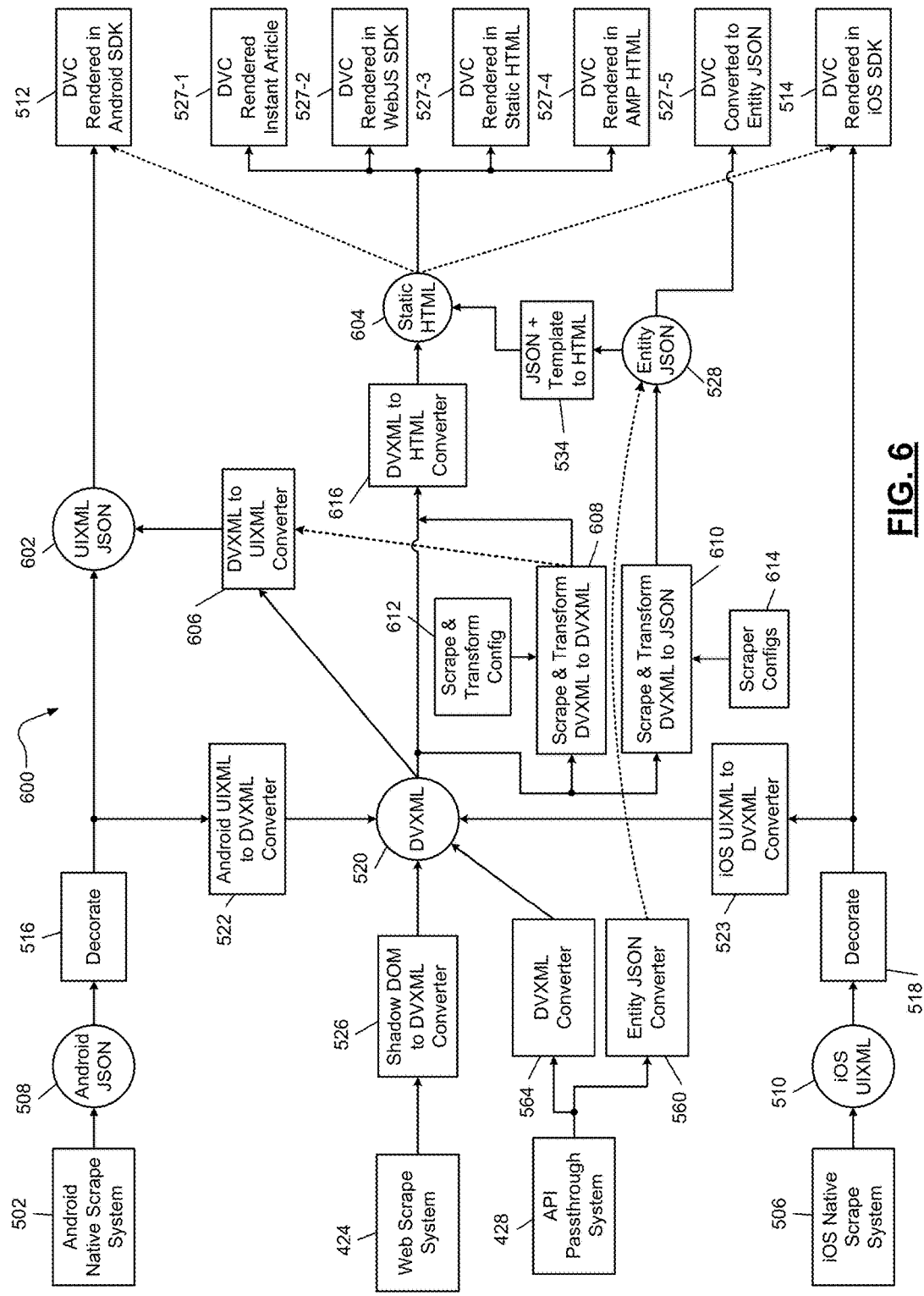
FIG. 6 is a block diagram of another example implementation of a results presentation system.

In FIGS. 5 and 6, example implementations of the presentation system 340 are shown. Additional discussion regarding processing the query and generating search results is found in commonly-assigned U.S. patent application Ser. No. 14/566,283, filed Dec. 10, 2014, titled "Rules-Based Generation of Search Results," with first-named inventor Michael Harris, the entire disclosure of which is incorporated by reference. See also commonly-assigned U.S. Provisional App. No. 62/179,674, filed May 13, 2015, titled "Application Search System," with first-named inventor Leigh Klotz, the entire disclosure of which is incorporated by reference. In FIGS. 5 and 6, all elements shown with rectangles may be implemented as modules, as defined below.

In FIG. 5, a presentation system 500 receives results from the native scrape system 432 of FIG. 4, which may include operating-specific systems, such as an Android native scrape system 502 and an iOS native scrape system 506. Another source of results is the web scrape system 424 of FIG. 4.

Native apps and web sites can be represented as a three-layer stack of the application developers' presentation layer, the developers' business logic, and the developers' data access. Typically, these layers are split across the developers' backend cloud servers and the developers' application software.

Search engines historically have used direct access to the developers' cloud services through hypertext markup language (HTML). Increasingly, HTML can incorporate developers' presentation and other logic by using JavaScript. Most search engines attempt to understand what that logic is with varying degrees of success. More recently, website developers and application developers tend to develop search-engine-friendly versions of their pages and expose the pages with simple HTML and no JavaScript. In other words, the search engine indexes the pages, and when the user's search query lands on one of those pages, the developer's server then re-routes the query and redirects the query to the full-featured JavaScript page with the client logic that is opaque to the search engine.

The search system of the present disclosure is based on the recognition that the applications can use a two-step search in order to effectively scale and accurately represent the developers' intent. The native scrape system is a way of performing the two-step search without requiring the developers to build a search-engine-accessible version of their site that omits extensive scripting. In the two-step search, an app's capabilities are characterized first. Then, the user's query is sent using a native scrape system to a copy of the actual app. The search results are obtained, and the search results, or a summary, are prepared and provided to the user. The user may then evaluate the summarized information to decide which search result to select.

The two-step search is now described in further detail. The first step is to take the user's query and context information and determine which application and function of the application will answer the query. A simple example of context information is location and temporal information. The native scrape system focuses on two types of functions: search functions and lookup functions.

The search system uses an index of search functions. For example, consider a function in a restaurant-finding application that helps find any restaurant. The user types in a restaurant name, or some other information about the restaurant, and the application finds it. The application may also have buttons in its opening screen that the user can activate.

For example, the buttons may include "Thai," "Vietnamese," "banquet," and "catering." These buttons act as filters to further specify the search. To the user, however, the buttons appear as different functions. Alternatively, the user may be able to perform the same function by accessing a pull-down menu that lists specific items for the user to select. For example, the user may click the pull-down menu and select "Thai." The user may then type a particular dish (such as Pad Thai). In another example, if the user is looking for a particular restaurant, then the user may type in the restaurant name, such as Amarin Thai.

Thus, the user types in a query (e.g., Thai), and the search system determines whether the user is looking for a generic restaurant search, a restaurant search for Thai cuisine, or for catering. The search system determines which function in the app to use, and the search functionality of various apps that can service the query.

When the user types a query (such as Pad Thai), a knowledge system associated with the search system knows that "Pad Thai" is both the name of a dish and that "Pad Thai" is a dish found in restaurants. The user interest finder (UIF) categorizes the query type and may assign a confidence to each potential categorization. For example, the UIF might assign a 90% likelihood that the user is looking for a restaurant serving Pad Thai and a 10 percent likelihood that the user is looking for a recipe. To arrive at the determination, UIF might take into account a priori information for likelihood of those assumptions. For example, the a priori information may include general popularity information of various queries and may also include prior activity of the user, such as a history of recipe searches.

The UIF may take into account temporal information, either large scale or short term, maintained by the search system. For example, around Valentine's Day, a query for soufflé may more likely refer to a restaurant, while during the rest of the year, the query for soufflé would more likely be for a recipe. The UIF is responsible for making those determinations from a priori knowledge and also from the context information.

Assuming, for example, the search system proceeds with the 90 percent restaurant search and the 10 percent recipe search, the search system enters the next phase: using the search function matcher (SFM). In this step, the search system tries to find, for all of the functions and all of the applications in the search function matching index, which functions and applications provide the restaurant search, and which functions and application provide the recipe search. The system handles these two searches as two independent parallel problems. The following discussion focuses on the restaurant search problem.

In one example, the search system finds three different restaurant-search applications, each one having different functions that can find restaurant information. For example, the search system may identify informational apps (such as Wikipedia), e-commerce apps (such as Amazon), etc., but since none of these applications would help the user find a restaurant, these types of apps should be excluded. To exclude those apps, the search system looks at the query "Pad Thai" to determine that the user is searching for a specific dish. Accordingly, the search system looks for search functions that are known to work well with finding dish names.

In this example, the Yelp app's generic search function works well with dish names, and a Foodspotting app's search function works well with dish names. Another restaurant finding application, such as Zomato, may have a search function for finding a restaurant serving a particular dish. Accordingly, the user would select Zomato to search for a particular restaurant search for a particular cuisine.

In this example, the SFM would use the Yelp, Foodspotting, and Zomato applications and output search function URLs (SFURLs). The SFURLs are provided to the dynamic acquisition system 324 along with context information.

A simple example of context information is as follows. For example, for Yelp's generic restaurant search, it may be important to have the correct city because someone in Mountain View, Calif. would likely not be interested in restaurants in New York. Accordingly, location is included as context information.

The following discussion uses the Android native scrape system 502 for purposes of illustration only. However, the principles also apply to the iOS native scrape system 506. To improve latency, the Android native scrape system 502 may already have an application emulator running the Yelp application, in which case, the Yelp application is likely open with its home screen.

The Android native scrape system 502 would contact an emulator server executing the Yelp app and send the search request to the Yelp app to perform the requested search. The search system has two ways to perform the requested search: one way is to use the Android Intents System, and another way is a similar system used in Apple iOS. Sometimes the requested search is performed using an access URL, which is not the same as a search function URL. Other times the requested search is performed by using accessibility interfaces or some other type of interfaces, or some other type of button activation that one would use for testing an application in a test system.

Accordingly, in FIG. 5, the Android native scrape system 502 activates the application, and requests that the app perform the requested search. The app then collects the content area, including images, and deep links from the result page. Collecting the content area is similar to what is done for a web snippet. When a user wants to find a summary of a webpage for display in a search engine, the user may desire to only see the content that the user searched for, but not advertisements, etc. The Android native scrape system 502 filters out undesired content and creates a representation of the content area that captures the developer's presentation and intent.

The images collected by the Android native scrape system 502 are from the representation of the content. The deep links collected by the Android native scrape system 502 are from that search page to specific entity pages.

In the above restaurant finding example, there may be three nearby restaurants that serve Pad Thai. The Android native scrape system 502 has mechanisms for collecting the deep links, but in general, it may be a time-intensive process. Therefore, the Android native scrape system 502 has a streaming system where the structure of the page is sent as a response, which is then followed by the images and the deep links.

The Android native scrape system 502 outputs the search results in extensible markup language (XML) or JavaScript object notation (JSON) format. This format may be native to the platform, such as Android user interface XML (UIXML) 508 or iOS UIXML 510. First, the structure of the page is output as a response in the native format. The images are then output as image attachments to the response. The XML or JSON list of deep links is then output as URLs.

The deep links vary on each request. For example, if the user opens the Yelp app, types in a search string (such as "Pad Thai"), and presses search, the user cannot tell simply by looking at the screen what the displayed responses link to. This is unlike a typical web search, such as on the Google website, in which the search results sometimes show the target URL of the link (which may require hovering the mouse over the link).

In the Android operating system, however, it is often not possible to figure out what the link is without actually clicking on it. One of the mechanisms the Android native scrape system 502 uses is an automation tool under programmatic control. The tool is used to click on the links. The programmatic control is as follows: click on links one, two, and three; and then, use event propagation (e.g., set a breakpoint) to cancel the click once the click performs the developer's computation logic to decide what to do upon clicking the link. For example, this process is similar to running the application under a debugger—setting a breakpoint before it calls the network, capturing the arguments, and then canceling the request.

Thus, access to the developer's computation logic can be gained without actually executing the link. When a link is clicked, the Android native scrape system 502 does not actually go to the linked pages. Instead, by clicking on the link and then canceling the link, the Android native scrape system 502 generates a fully-formed request that would have gone to the linked page. The Android native scrape system 502 captures the information in the fully-formed request, reverses its structure, and converts it into a URL, which is output as a search result. The search result is formatted in a device-specific manner: either it is HTML that has come from the screen or it is Android UIXML (or the equivalent for iOS).

If the search result can be used directly for rendering on an Android library 512 from the search system 100 or an iOS library 514 (i.e., depending on the user device that issued the query), then the search result is displayed as is on the Android library 512 or iOS library 514, respectively. Alternatively, the search result can be cleaned up and/or embellished and sent to the Android library 512 or the iOS library 514 for rendering. The cleanup operation is shown as decorate functions 516 and 518.

In one example, the decorate functions 516, 518 include reformatting, normalizing, and/or removing some of the information from the search results output by the Android native scrape system 502 (or the iOS native scrape system 506). In another example, the decorate functions 516, 518 include adding one or more of a background, a box surrounding the search results, an icon of the application that generated the search results, and/or some other stylistic or decorative features. The output of the decorate functions 516, 518 may be cached for reuse.

The decorate functions 516, 518 are similar to optical character recognition (OCR). The decorate functions 516, 518 include processing the search results from the App cloud and generating data that can be fed to another system that would make the application developer's presentation appear. For example, if the developer used custom widgets, the decorate functions 516, 518 may evaluate those custom widgets. If the custom widgets are too complex, the decorate functions 516, 518 can replace them with an image. For example, in the Uber application, the decorate function would replace an image with vector graphics by an Android text box and associated parameters for its visualization (e.g., a text box with a particular border color or something that can be easily captured).

Branching from the decorate function 516 (or 518) to deep view XML (DVXML) 520 is now described. DVXML is a platform-neutral representation format of the present disclosure. DVXML is based on XML and a reduced set of HTML. If the output of the decorate function 516 (or 518) can be presented directly on the user device as the developer intended, then no further processing is necessary. However, there are two situations in which further processing of the cleaned-up search results provided by the decorate function 516 (or 518) may be desirable.

First, a presentation of a summary of the results, instead of the actual results, may be desired. For example, it may be desirable to place an advertisement in the presentation, and the advertisement may have certain requirements. For example, the advertisement format may have two lines of text and one image, and the image must be a certain size, and so on.

This type of presentation can use human-supplied information or automated information to determine the relevant parts of the text and the most important lines in the cleaned-up search results. For example, the restaurant name may be more important than the telephone number, and is therefore preferred for an advertisement. Determining these rules is called DV authoring and may be performed using a DV authoring software tool.

Second, it may be desirable to provide just a data representation of the cleaned-up search results without the images or the layout. For example, if it is desirable to know the price of a searched item, the location of the restaurant, or the telephone number, the image or layout data can be scraped. The data may then be presented in semantic JSON or JSON for linked data (JSON-LD).

For these two situations, the cleaned-up output of the decorate functions 516, 518 may be transformed for use in an online system, such as advertisements, summarization, or for providing to another data system (e.g., another business entity), or for integration into third party search results.

To avoid writing multiple different scraping and reformatting systems, the cleaned-up search results are first transformed into DVXML format by a UIXML to DVXML converter 522 (or 523 in iOS path). Then the converted search results in the DVXML format can be output to a scraper (shown as scrape and transform module 524), which uses scraper configurations 525 to scrape data, and transforms the scraped data to either produce a visual output or a data output.

If the search results are provided by the web scrape system 424, a shadow document object model (DOM) to DVXML converter 526 converts HTML output from the web scrape system 424 into the DVXML format.

In various implementations, DVXML may exclude JavaScript and be limited to a limited set of predetermined elements. The output in the DVXML format can then be transformed into something that is very simple to display on a mobile device (e.g., a phone or a tablet) or very simple to display on a webpage. Facebook Instant Articles and Google AMP (Accelerated Mobile Pages) are examples of similar types of file formats. The DVXML can be used to generate one of those two formats. For example, see elements 527-1, 527-2, 527-3, and 527-4, showing different representations generated using DVXML, which can be displayed on the user device and/or supplied to third parties (i.e., other business entities).

Therefore, regardless of source, results are converted from respective native formats to DVXML 520. Then DVXML can be converted to an entity JSON by the scraper 524, which can be supplied to other business entities or systems (as shown by element 527-5), or a reformatted version can be supplied to the Android library 512 or the iOS 514 if it is desired to provide the user with a reformatted and summarized card rather than providing the exact layout received from the developer's application.

Note that DVXML is generally used for presentation. However, there may be systems downstream that need to attach semantic information. Therefore, DVXML can be input to a semantic tagger. The common format eliminates the need for semantic taggers that understand different application data formats, such as native Android, native iOS, and HTML.

Instead, if semantic tagging is desired, it is performed after DVXML conversion. The DVXML conversion normalizes data in the native format by adding landmarks from the original data. The DVXML conversion reduces the problem of application scraping across multiple platforms to a problem similar to web scraping in the pre-JavaScript era.

App scraping, similar to web scraping, can be used to perform semantic tagging. For example, different portions of the data in DVXML format can be scraped and designated as address, phone number, and so on. In some cases, the developer may have put in semantic markup into the webpage. DVXML would preserve that annotation if present. Application developers, however, typically do not put any semantic markup into the webpage.

Accordingly, the DV authoring software tool can be used to scrape application search results. For example, the DV authoring software tool can be instructed to select an element, and to designate the element as a telephone number. In this manner the tool can be instructed to extract the telephone number and to mark it as the telephone number. Other data, such as address and so on, can be similarly scraped and marked up using the DV authoring software tool.

Semantic tagging may need to be repeated when an application changes its result format. When the developer's original result layout is presented to the user, semantic tagging may be unnecessary. While reproducing a screenshot of a search result would be simple, the presentation system 500 uses a representation that is like a screenshot but is more compact (i.e., UIXML or DVXML representation following the decorate function 516) than the screenshot. Also, when screenshots are scaled, any text generally loses clarity.

In a compact presentation, the text font size may appear different on a slightly different screen of the user's device. The presentation system 500 (or presentation system 600) renders the search results on the user's device as close to the developer's intent as possible by providing the text portion of the search result, the Unicode text, the font name, and the font size for the text portion.

UIXML provides the ability to render search results on the user's device as close to the developer's intent as possible. DVXML is used when there is a need to convert the search results in different native formats to a single platform-neutral format that can be scraped, which may be performed for reasons such as transformation or extraction (as in semantic extraction) of the search results.

When the user is presented with the search results, the user can click on one or more deep links to access the respective application to obtain further information about the original query. The deep links can also be used to harvest additional information, such as taking some data from the search results and some data from clicking on a deep link and summarizing that result into a card.

The presentation systems 500, 600 can generate entity cards in addition to search state cards for presenting to the user. For example, the presentation systems 500, 600 can take the results after having clicked on a deep link of a particular restaurant and make that into a card as well. Although sometimes described collectively, the presentation systems 500, 600 are distinct implementations, so in general only one or the other (or a permutation of the two) will be implemented—the description should not imply that they operate in parallel on the same inputs.

Consider a news search, where the user types "top cricket news." The presentation systems 500, 600 determine that the query "top cricket news" should be sent to Times of India.

The presentation systems 500, 600 search Times of India for top cricket news and presents three summaries with links to the articles. The presentation systems 500, 600 can also generate a card that is the top cricket news item. In that sense, the top cricket news search would include performing the top cricket news search, clicking on the first item, and making a summary of the first item that is presented to the user.

In FIG. 6, a presentation system 600, which is a variation of the presentation system 500, is shown. Static HTML and decorated (i.e., cleaned-up) UIXML could be derived from any of the sources from which DVXML can be obtained. In the presentation system 600, in one example, it is assumed that the input to the user device (e.g., element 512) is at least 90 percent of the time the android UIXML (from element 602).

Accordingly, in this example, results in static HTML (from element 604) may be input to the user device (e.g., element 512) less than 10% of the time because, unlike UIXML, results in static HTML have performance disadvantages in terms of user interface performance (e.g., scrolling appears jaggy). In other examples, the above percentages may be 95% and 5%, 85% and 15%, and so on, instead of 90% and 10%.

In another example, suppose that there is one search result in the native format, followed by three search results in HTML, and then followed by one search result in the native format. In such a scenario, the three HTML search results can be combined together into one presentation. If, however, alternating search results are in HTML and native formats, presenting these search results in alternating fashion can burden a phone (i.e., the user device in which the Android library 512 is installed) and can degrade performance. Therefore, only an occasional HTML card mixed in with native cards may be presented.

In general, the presentation system 600 determines the format in which to present the results on the user device as follows. For results from the web scrape system 424, the converter 526 converts the results to DVXML, a DVXML to UIXML converter 606 converts DVXML to UIXML and sends the results in UIXML to the user device.

A converter (e.g., 522, 523, or 526) converts the results to DVXML 520. Then, the scrape and transform operations performed by elements 608 and/or 610, respectively utilizing scrape and transform configuration 612 and scraper configurations 614. The scrape and transform operations may be based on rules. One example of the rules may be transforming a developer's card having three lines of text and two pictures to one big picture and one line of text. There may be different rules depending on the content of the search results. Further, in some examples, all search results may be presented in HTML (e.g., from element 604), while in other examples none of the search results may be presented in HTML but rather only in the native format.

In other examples, after performing the transformation according to the applicable rule, the transformed search results in DVXML format are either converted to HTML by the DVXML to HTML converter 616 and rendered on the user device 512 in HTML, or are converted to UIXML by the DVXML to UIXML converter 606 and rendered on the user device 512 in UIXML.

In FIG. 5, in one example, a converter 532 converts the marked-up JSON 528 to DVXML format using a template from templates 530. The DVXML to HTML converter 616 converts the marked-up JSON and the template to HTML for rendering on the user device (e.g., libraries 512 or 514). Alternatively, a converter 534 converts the marked-up JSON 528 and a template to HTML for rendering on the user device (e.g., libraries 512 or 514).

The scraper 524 scrapes XML data from the search results using scraper configurations and produces name-value pairs. The name-value pairs are put in a template and then rendered back to DVXML or HTML. Alternatively, the search results can be scraped to entity JSON, and the user device does the rendering as shown by the dotted lines. Meanwhile, the decorate functions 516, 518 generally do not perform scrape and transform operations.

FIG. 6 provides a way to generate deep view cards from search results at a presentation level instead of at a semantic level. Semantic tagging may be provided using entity JSON. In various implementations, the entity JSON includes relevant information from a page but preserves none of the developer's formatting or layout. The entity JSON is distinct from the presentation of the deep view card. The entity JSON is normalized to a single schema so that it is independent of which application it came from. The schema may depend on which industry vertical the results are related to.

Referring back to FIG. 5, in some implementations, the scraping and template processing and semantic tagging can be avoided and replaced altogether by responsive reflow. A responsive reflow module 536 uses heuristics and rules to reflow UIXML data to fit certain types of scenarios. For example, one option is to have a heuristic system that takes DVXML data and then uses rules like "transform an input of unbounded complexity to one picture and two lines of text." In this example, the responsive reflow module 536 selects the biggest picture or the biggest picture that has a high complexity in the entropic sense. For example, the biggest image may simply be the picture with the biggest background, which may not be of any interest to the user. The responsive reflow module 536 selects the biggest picture on the basis of size and complexity and then selects the text similarly on an entropic basis.

Entropy refers to an entropic measure of diversity from Shannon's Information Theory, which would help eliminate large images of low complexity. Compression reduces large, low-entropy data sources such as images to smaller sizes, and so file size is a good indicator of image complexity, when the image is compressed with a method such as JPEG or PNG. However, there are other algorithmic or heuristic measures to determine which image is more interesting or useful, including but not limited to, page placement of the image, a priori human judgment, and a posteriori human judgment. Human judgment may be assessed based on user clickthrough feedback information from multiple tests of different images for a given deep view type.

Taking into account characteristics such as bolding and font size, and also possibly recognizing an address or a phone number, the responsive reflow module 536 extracts those items using various heuristics. Then, the responsive reflow module 536 fits the extracted information into a layout (selected from layouts 538) by discarding some information.

This process is called responsive reflow because responsive design is the name given in the HTML community to the use of HTML and cascading style sheets (CSS) in such a way that a webpage can be rendered on different screen sizes and resolutions for laptops, desktops, tablets, and phones.

For example, using knowledge gained from scraping and template processing and semantic tagging, the responsive reflow module 536 can generate heuristics that determine interesting or useful items on a page and then selects one of those items. The responsive reflow module 536 can produce multiple different renderings of the same deep view card. For example, the constraint may be to produce a 320-pixel by 240-pixel representation from a full-screen result.

The responsive reflow module 536 implements algorithms that monitor which user interface (UI) elements receive the most clicks, and preserve those UI elements receiving the greatest amount of interaction. This may not require any deep semantic understanding of whether the information extracted is a price, address, etc. The responsive reflow module 536 can produce multiple different reflows.

Reflow refers to a technique used in page description languages. For example, when rescaling a PDF, the text can move around graphics by adjusting line breaks without changing the content. Thus, a responsive reflow engine for DVXML can produce one or more automatically-generated reduced summaries of the output (i.e., search results).

Process

Figure 7:
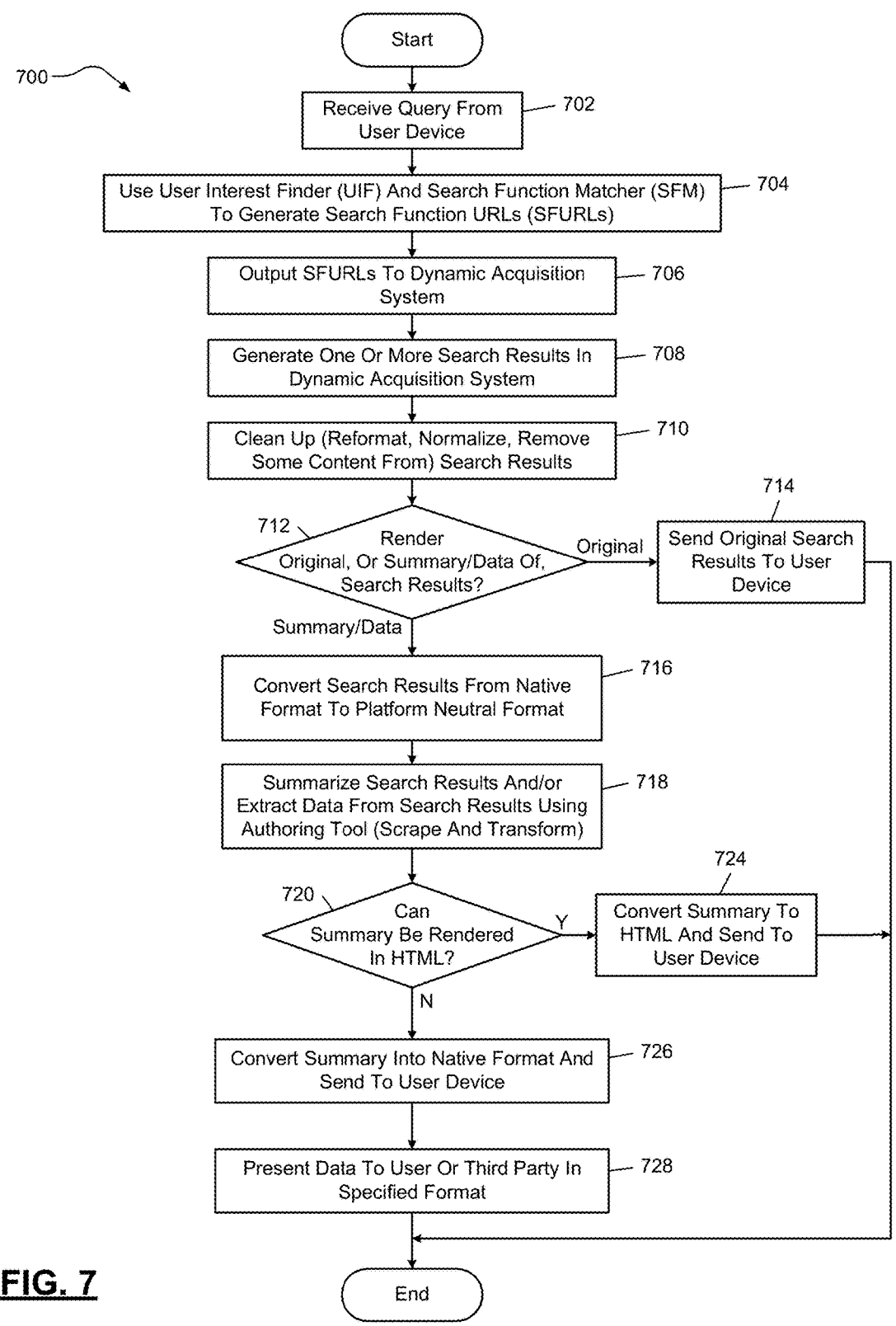
FIG. 7 is a flowchart showing example operation of a results presentation system.

In FIG. 7, a flowchart depicts example operation of a presentation system. Control begins at 702, where a search query from a user device is received. At 704, control uses a user interest finder (UIF) and a search function matcher (SFM) to generate search function URLs (SFURLs). At 706, control outputs the SFURLs to a dynamic acquisition system. At 708, control generates one or more search results, such as by using one or more emulators. At 710, control cleans up (e.g., adds and/or subtracts) content from the search results, which may be called decorating the search results.

At 712, control determines whether to render the originally-formatted search results in native format on the user device or render a summary of the search results on the user device. Alternatively or additionally, control determines whether to extract data from the search results for presentation to the user device and/or a third party in any format. If control determines to use the originally-formatted results, control proceeds to 714; otherwise, control proceeds to 716. At 714, if control decides to render actual search results, control sends the actual search results to the user device. Control may end after completion of 714.

At 716, if control decides to render a summary of search results and/or to extract data from the search results, control converts the search results to a platform-neutral format. At 718, control summarizes the search results and/or extracts data from the search results using an authoring tool, which performs scrape and transform operations on the search results.

At 720, control determines whether the summarized search results can be rendered in HTML on the user device. If so, control proceeds to 724; otherwise, control proceeds to 726. At 724, if control decides to render the summarized search results in HTML, control converts the summarized search results to HTML and sends the search results in HTML to the user device. Control ends after completion of 724.

At 726, if control decides not to render the summarized search results in HTML, control converts the summarized search results into the native format of the user device and sends the search results in the native format to the user device. At 728, control presents the extracted data from the search results to the user device and/or a third party in any format (e.g., in native format, HTML, or entity JSON to the user device, and/or in HTML or entity JSON to a third party). Control ends after completion of 728.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Logo, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A system comprising:
a communication interface circuit;
a search engine;
a processor configured to:
receive a query from a mobile device using the communication interface circuit,
search mobile applications based on the query using the search engine,
wherein the mobile device is configured to run an instance of a first operating system,
wherein the mobile applications are configured to execute on the first operating system,
wherein the search engine is configured to, in response to receiving the query, (i) execute instances of the mobile applications on hardware running the first operating system and (ii) scrape search results from the executed instances of the mobile applications,
wherein the hardware includes at least one of a device running the first operating system and an emulator running the first operating system, and
wherein the processor is further configured to:
generate the search results in a first format for rendering on the mobile device,
convert the search results into a second format using a first converter,
generate a presentation of the search results in the second format, and
convert the presentation into the first format for rendering on the mobile device using a second converter.

2. The system of claim 1,
wherein the first format is a native format of the mobile device, and
wherein the second format is a platform-neutral format.

3. The system of claim 1, wherein the presentation includes a summary of the search results.

4. The system of claim 1, wherein the processor is further configured to add information to the presentation based on content of the presentation for rendering on the mobile device.

5. The system of claim 1, wherein the processor is further configured to generate the presentation by extracting data from the search results and by transforming the extracted data into the second format.

6. The system of claim 1, wherein the second processor is further configured to:
extract data from the search results,
transform the extracted data into a third format that includes semantic tagging, and
output the extracted data in the third format.

7. The system of claim 6, wherein the third format is JavaScript Object Notation format.

8. The system of claim 6, wherein the second converter is further configured to convert the extracted data into a fourth format.

9. The system of claim 1, wherein the processor is further configured to generate multiple presentations of the search results for rendering on multiple mobile devices having different rendering capabilities.

10. The system of claim 9, wherein the second converter is further configured to convert the multiple presentations into a third format for rendering on the multiple mobile devices.

11. A method comprising:
receiving, by a processor of a system, a query from a mobile device using a communication interface circuit of the system, wherein the mobile device is configured to run an instance of a first operating system;
in response to receiving the query, executing, by the processor, instances of mobile applications on hardware running the first operating system, wherein the hardware includes at least one of a device running the first operating system and an emulator running the first operating system;
generating, by the processor, search results in a first format by scraping the search results from the executed instances of the mobile applications;
converting, by the processor, the search results into a second format;

generate, by the processor, a presentation of the search results in the second format; and
converting, by the processor, the presentation into the first format for rendering on the mobile device.

12. The method of claim 11,
wherein the first format is a native format of the mobile device, and
wherein the second format is a platform-neutral format.

13. The method of claim 11, wherein the presentation includes a summary of the search results.

14. The method of claim 11, further comprising adding, by the processor, information to the presentation based on content of the presentation for rendering on the mobile device.

15. The method of claim 11, further comprising generating, by the processor, the presentation by extracting data from the search results and by transforming the extracted data into the second format.

16. The method of claim 11, further comprising:
extracting, by the processor, data from the search results;
transforming, by the processor, the extracted data into a third format that includes semantic tagging; and
outputting, by the processor, the extracted data in the third format.

17. The method of claim 16, wherein the third format is JavaScript Object Notation format.

18. The method of claim 16, further comprising converting, by the processor, the extracted data into a fourth format.

19. The method of claim 11, further comprising generating, by the processor, multiple presentations of the search results for rendering on multiple mobile devices having different rendering capabilities.

20. The method of claim 19, further comprising converting, by the processor, the multiple presentations into a third format for rendering on the multiple mobile devices.

* * * * *